Figure 1:
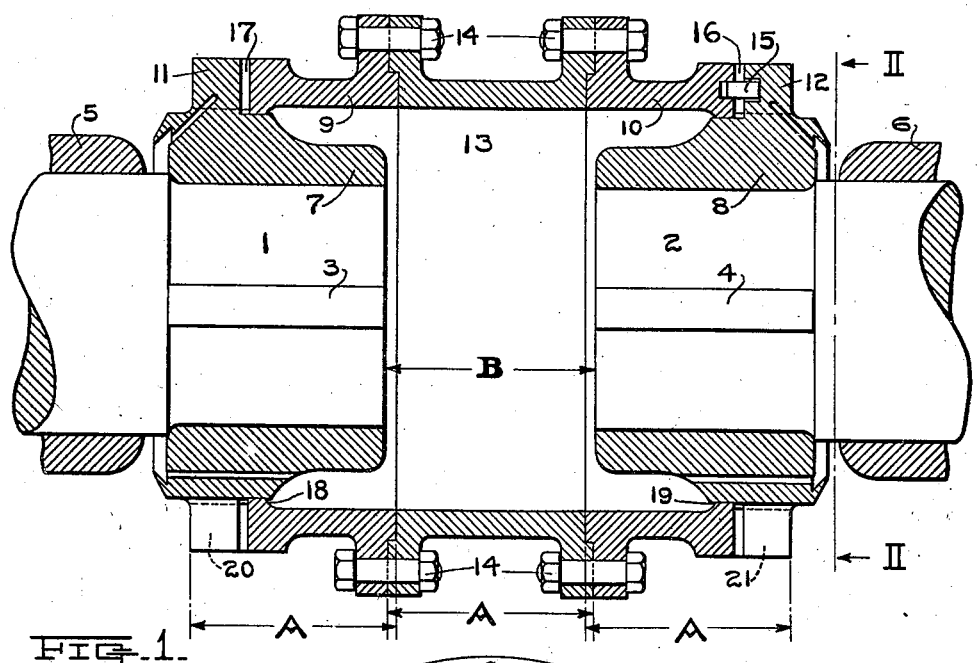

M. ROTTER.
SHAFT COUPLING.
APPLICATION FILED JUNE 18, 1910.

1,007,312.

Patented Oct. 31, 1911.

WITNESSES — 
W. H. Lieber
Tekla Bast

Max Rotter INVENTOR —
BY
ATTORNEY.

UNITED STATES PATENT OFFICE.

MAX ROTTER, OF MILWAUKEE, WISCONSIN, ASSIGNOR TO ALLIS-CHALMERS COMPANY, OF MILWAUKEE, WISCONSIN, A CORPORATION OF NEW JERSEY.

SHAFT-COUPLING.

1,007,312.  Specification of Letters Patent.  Patented Oct. 31, 1911.

Application filed June 18, 1910. Serial No. 567,594.

*To all whom it may concern:*

Be it known that I, MAX ROTTER, a citizen of the United States, residing at Milwaukee, in the county of Milwaukee and State of Wisconsin, have invented a certain new and useful Improvement in Shaft-Couplings, of which the following is a specification.

This invention relates to improvements in the construction of couplings and more particularly to improvements in the construction of couplings for uniting two movable members, such as rotating shafts, the coupling being adapted to be removed in order to disconnect the members.

The object of the invention is to provide a coupling for shafts which is simple in construction, efficient in operation and which can be easily removed from the shafts without disturbing the positions of same.

A clear conception of one embodiment of the invention can be obtained by referring to the accompanying drawing, in which like reference characters designate the same or similar parts in like or different views.

Figure 2:
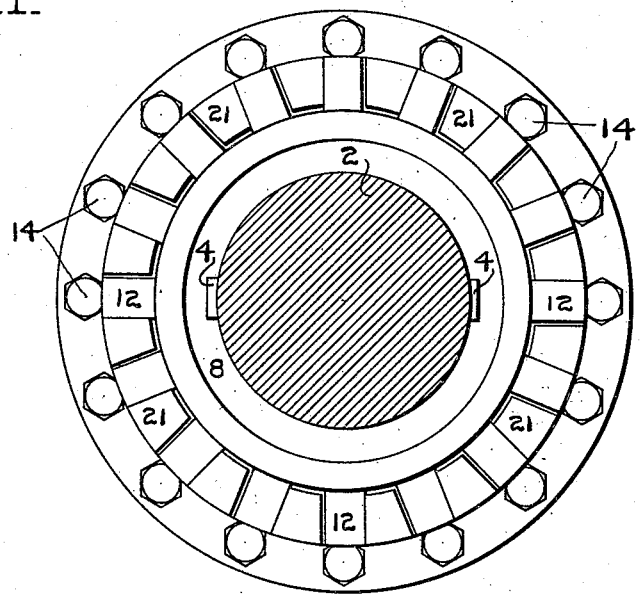

Figure 1 is a central vertical section through a coupling showing its application to two fragmentary shaft ends. Fig. 2 is an end and part sectional view of the device shown in Fig. 1, the section being taken on the line II—II of Fig. 1, looking in the direction of the arrows.

The shafts 1, 2, see Fig. 1, are mounted in bearings 5, 6 respectively and are coaxial with each other. The end member 7, which is fitted over the overhanging end of the shaft 1, is keyed thereto by means of a key 3, and has a series of outwardly projecting radial lugs 11 formed at its periphery. The end member 8 is similarly fitted over the overhanging end of the shaft 2, being keyed thereto by means of a key 4, and has outwardly projecting radial lugs 12 formed at its periphery. It is not essential that keys 3, 4 be used in fastening these members to the ends of the shafts 1, 2, as any other suitable means, such as bolts, or by shrinking the members 7, 8 onto the shaft ends, may be used to accomplish the same purpose. The end coupling sleeve 9 is mounted over the end member 7, coacting therewith along a cylindrical surface 18. This end sleeve 9 has lateral projections 20 which extend into the spaces formed intermediate the radial projecting lugs 11 of the member 7. The end coupling sleeve 10 is mounted over the end member 8 and coacts therewith along a cylindrical surface 19. This end member 10 has lateral projections 21 which extend into spaces formed intermediate the radial projecting lugs 12 on the end member 8. Dowel pins 15 serve to properly position the sleeves 9, 10 relative to the members 7, 8, respectively. The members 7, 8, as well as the sleeves 9, 10, are constructed exactly alike, thereby making these like elements interchangeable with each other. The central sleeve 13 is cylindrical in form and coacts with the sleeves 9, 10, one at either end of the sleeve 13, along surfaces formed perpendicularly to the axis of the shafts 1, 2. The bolts 14 which pass through outwardly projecting flanges formed on the sleeves 9, 10, 13 serve to maintain the coaction between the sleeves. The several lengths, or distance A, of sleeves 9, 10, are precisely the same for all. The distance B formed intermediate the overhanging ends of the shafts 1, 2 is slightly greater than the distance A or the overall length of each separate sleeve.

In placing the coupling into position the end members 7, 8 are fitted upon the ends of the shafts 1, 2, and are fixed thereto by means of the keys 3, 4. The sleeve 9 is then inserted between the ends of the shafts 1, 2, this insertion being permitted, owing to the fact that the distance A or the overall length of the sleeve 9 is less than the distance B between the shaft ends. After having been passed between the shaft ends the sleeve 9 is shifted longitudinally of the shaft 1 until the surfaces 18 coact and the projections 20 formed at the ends of the sleeve 9 interlock with the radially projecting lugs 11 of the member 7. It will be noted that a space 17 has been shown between the surface of the lugs 11 on the coupling side thereof and the end surface of the sleeve 9. During assembling of the coupling and while the sleeve 9 is being shifted longitudinally of the shaft 1, the space 17 is entirely closed. The sleeve 10 is then inserted between the ends of the shafts 1, 2 after which it is shifted longitudinally of the shaft 2 until the surfaces 19 of the sleeve and end member coact and the projections 21 of the sleeve 10 interlock with the radially projecting lugs 12 of the member 8. The longitudinal shifting of the sleeve 10 is continued until the space 16 normally formed between the lugs 12 and the sleeve 10 is entirely closed. After the sleeves 9, 10 have been brought to the positions above described, the cylindrical sleeve 13 is inserted between the ends of the shafts 1, 2 and of the sleeves 9, 10. The sleeves 9, 10 are then slid upon the surfaces 18, 19 until their ends coact with the ends of the sleeve 13. This shifting of the sleeves 9, 10 again produces the spaces 17, 16. After the sleeves 9, 10 have been brought in coaction with the ends of the sleeve 13 the bolts 14 are inserted and the assembling of the coupling is completed.

In the construction of the coupling as shown, it would not be essential to have dowels 15 inserted between the end members 7, 8 and the sleeves 9, 10 respectively, since these sleeves might be shifted to any angular position around the axis of the shafts 1, 2, and the holes for the bolts 14 would still register with each other. Such dowels 15 would, however, be necessary in case the machining of the surfaces of coaction between the lugs 11, 12 and the projections 20, 21 were imperfect or in case a fewer number of bolts 14 were used to maintain the sleeves in coaction. It will be noted that the spaces 17, 16 formed between the end members 7, 8 and the sleeves 9, 10 respectively permit a certain amount of end motion of either of the shafts 1, 2 relative to the other. During such relative shifting or end movement, the sleeves 9, 10 slide longitudinally on the surfaces 18, 19 of the end members 7, 8 respectively. The radially projecting lugs 11, 12 furthermore slide along their surfaces of coaction with the projections 20, 21 respectively, and the spaces 17, 16 are closed or enlarged, depending upon the degree of relative movement between the shafts. During such sliding of the elements, it is essential to maintain a perfect lubrication of the coacting surfaces, and it is therefore desirable to have a simple lubricating system introduced in the coupling. Such a simple and efficient system of lubrication is fully disclosed in patent to McKee 875,588, dated Dec. 31, 1907. It might also be noted that it is not essential to have the distance A or the length of the sleeves 9, 10, 13 as great as shown, as this distance A might be decreased by placing the lugs 20, 21 nearer the ends of the shafts 1, 2. Such construction would also decrease the distance B necessary for the insertion or removal of the coupling.

The bore of the sleeves 9, 10, is generally formed of such a diameter that a small amount of play exists between the sleeves 9, 10, and the end members 7, 8, at the surfaces 18, 19, respectively. With such an existing space between these elements it is not necessary to have exact alinement between the shafts 1, 2, the difference in alinement being taken up by the play or space. It is, moreover, not essential to have the sleeves 9, 10, 13, made solid, this form being shown since it is the strongest and most convenient, but the sleeves might just as easily be made of sections if such construction were found to be more desirable.

It should be understood that it is not desired to be confined to the exact details of construction shown and described, for obvious modifications will occur to a person skilled in the art.

It is claimed and desired to secure by Letters Patent:

1. In a shaft coupling, a plurality of shafts having a space intermediate their ends, a lug projecting from each of said shafts, a plurality of sleeves each having a projection engaging said lug on one of said shafts, and an intermediate sleeve connecting said sleeves, said sleeves being of substantially equal lengths and of less length than the distance between the ends of said shafts.

2. In a shaft coupling, a plurality of shafts having a space intermediate their ends, a lug projecting from each of said shafts, a plurality of sleeves each having a projection engaging said lug on one of said shafts, and an intermediate sleeve connecting said sleeves, said shafts being adapted to move longitudinally relative to each other, said sleeves being of equal lengths and removable through said space between said shafts.

3. In a shaft coupling, a pair of shafts having a space intermediate their ends, a lug projecting from each of said shafts, a plurality of sleeves each having a projection engaging said lug on one of said shafts, and an intermediate sleeve connecting said sleeves, each of said sleeves being of substantially equal lengths and of less length than the distance between the ends of said shafts.

In testimony whereof, I affix my signature in the presence of two witnesses.

MAX ROTTER.

Witnesses:
G. F. DE WEIN,
W. H. LIEBER.